Aug. 20, 1929.   W. J. H. STRONG   1,725,316
ROTORCRAFT
Filed June 13, 1925   6 Sheets-Sheet 3

INVENTOR.
William J. H. Strong,
BY Wallace R. Lane
ATTORNEYS.

Patented Aug. 20, 1929.

1,725,316

UNITED STATES PATENT OFFICE.

WILLIAM J. H. STRONG, OF CHICAGO, ILLINOIS.

ROTOR CRAFT.

Application filed June 13, 1925. Serial No. 36,783.

The present invention relates to devices that produce reactions in, act upon, or operate in fluids whereby there is a relative movement of the fluid and the device. For the purpose of illustrating the invention, the same has been disclosed herein in connection with aircrafts but it is to be understood that the invention comprehends other devices capable of acting or reacting on fluids whether gaseous or liquids, and it is not limited to the preferred embodiment chosen to explain the invention.

It utilizes the application of the principle of the Magnus effect which is that when a cylinder rotates in a current of fluid flowing in a direction at right angle to the axis of the cylinder, there is a stress or reaction effected upon the cylinder perpendicular to the direction of flow of the fluids, and if the cylinder is free to move, a resultant reaction or thrust in the direction of the stress is effected upon the cylinder. Also, it was found that there was a suction, reduction of pressure or rarefaction in the region of the cylinder surface traveling in the direction of flow of the fluid, and that there was a compression, increase of pressure or condensation in the region of the cylinder surface moving in a direction opposite to that of the flow of the fluids.

The present invention comprehends the application of this principle to various devices, such as aircrafts, vehicles of various kinds, ships, submarines, fans, wind mills, blowers, and various other similar and like devices.

In my experiments I have discovered that this principle can be applied to other rotating bodies, such as cones, frustums of cones, stepped cylinders, stepped cones and even curved bodies having symmetrical or circular cross-sectional areas, and I have also found that the effect may be enhanced by the use of plates or flanges or shoulders arranged in planes transverse to the axis of rotation of the rotor. In the case of stepped rotors, the shoulders between the sections of the rotor act as flanges or disks. By locating a rotor in an aircraft where the air stream may act upon such rotor or auxiliary means for giving the rotor the proper rotation, a lifting effect upon the aircraft can be produced, and likewise a resistance to falling, in the event of the motive plant of the aircraft stalling, thus preventing a nose dive or tail spin in the case of aeroplanes and drops in the case of helicopters, etc.

Among the objects of the invention is also to provide a device capable of moving or traveling in a fluid whereby there will be created a relative movement of the fluid and the device or craft, and comprising a rotor preferably varying in diameter and acting, when rotating, to react upon the relatively movable fluid to effect a resultant reaction or stress upon the rotor, and the device including it, in a direction transverse to the direction of movement of the fluid relative to the rotor and the device or craft. Means are preferably provided for driving the rotor to cause the same to rotate at the desired surface speed, whereby the surface or skin friction thereof upon the fluids, such as the air, may be sufficient to cause the effect above mentioned. In case of an aircraft, the rotating of the rotor may be effected by the motive plant, but preferably by a power unit auxiliary to the motive plant, such as a propeller, operated by the slip stream of the propelling propeller or by the air as the craft moves through the air, the latter being preferably used because the rotors can be operated in the event that the motor of the craft should become stalled.

The invention also comprehends the provision of such rotors of varying diameters as by tapering the rotors or stepping them to different diameters so that the varying of the diameters of the rotors will increase its efficiency in meeting moving fluids or air of varying velocity in its length. The rotors may be cone-shaped or in the form of frustums of cones, or axially of different diameters with shoulders between each section, the shoulders also acting as disks or flanges located in planes transverse to the axis of rotation of the rotor.

Whether or not these rotors be of the form above indicated or are of cylindrical form, another object of the invention is to provide such rotors with a plate or plates either at the end or ends of the rotor or intermediately thereof, or the provision of disks, shoulders, flanges and the like, preferably in planes transverse to or perpendicularly to the axis of rotation of the rotor, whereby the efficiency of the rotor may be increased. In theory, a rotor of infinite length would operate with greatest efficiency. The theoretical rotor is not practically possible. With rotors of finite length, it has been found that certain losses are present at the ends of the rotor, the fluid acting in vortices or eddies about transverse axes. It has also been found that the provision of end disks will greatly reduce these vortices or eddies and enhance the practical efficiency of the rotor. These disks may be relatively fixed, or form a part of the rotor and rotate with it. A plurality of disks or flanges may be provided in suitably spaced relation with increased efficiency effects. The tapering or stepping of the rotor will also produce a like effect, the diametrically increasing portion effecting an axial component force on the liquid similarly to that produced by the flanges, disks or plates. The taper may also be in a direction toward the ends of the rotor so that the diameter of the rotor at the ends will become zero, in which case, theoretically, the rotor should be of the same efficiency as a rotor of infinite length.

Another object of the invention is to provide rotors in a series preferably in the form of an aerofoil, with the rotors preferably progressing in diametrical dimension in the series and also preferably with the surface speeds of the succeeding rotors being greater than that of the preceding rotors. If the rotors be of like diameters, progressive rotative speed will effect the progressive surface speeds. If the rotors increase progressively in diameter, the progressive surface speeds may be had by rotating all the rotors at substantially the same rotative rates.

The invention also comprehends the provision of an aerofoil with an aerofoil body portion and a rotor at the leading edge of the aerofoil or body portion thereof. The rotors may be within the aerofoil with a leading edge thereof ahead of the rotor, or the aerofoil with a leading edge thereof ahead of the rotor, or the aerofoil may be made up wholly of a series of rotors as above indicated.

Other objects, capabilities and advantages are comprehended by the invention as will later appear and are inherently possessed by the invention.

Referring to the drawings showing illustrated embodiments of the invention.

Figure 1:
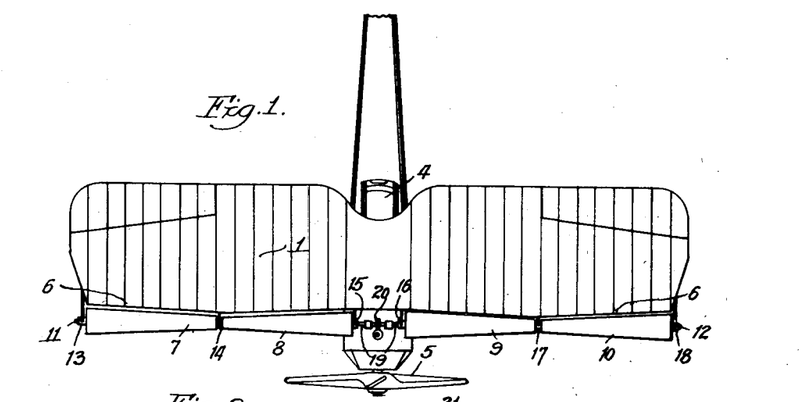
Figure 1 is a top plan view of an aeroplane embodying the invention.
Figure 2:
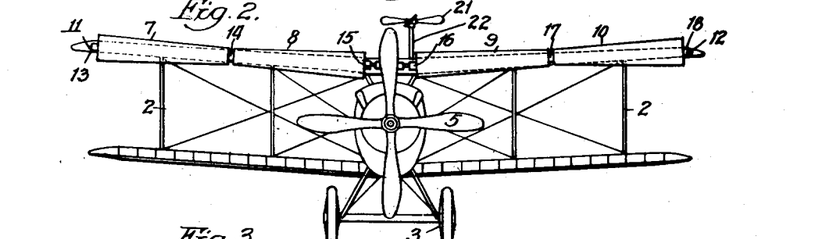
Figure 2 is a front view of the same.

Referring now more in detail to the drawings, the embodiments chosen to illustrate the invention are shown, particularly in Figures 1 and 2, as comprised in an aeroplane having an aerofoil 1, fuselage 2, a landing gear 3, a cock-pit 4 in which is located a suitable power plant for driving a propelling propeller 5 at the forward end of the aeroplane, this being of the tractor type.

At the forward edge or leading edge 6 of the aerofoil are rotatably mounted one or more rotors 7, 8, 9 and 10, these rotors shown in Figures 1 and 2 being tapered or in the form of frustums of cones. These rotors may be of hollow structure for the sake of lightness and have shafts 11 and 12 finding suitable bearings in bearing members 13, 14, 15, 16, 17 and 18 suitably secured to the fuselage of the aircraft. The inner ends of the shafts have extensions 19 suitably geared or otherwise connected, to the gearing 20 driven in any suitable manner. The gearing may be connected to a driving part of the engine but is preferably connected to a propeller 21 operating through suitable driving mechanism 22 connected to the gearing 20 and located in the path of the air stream passing from the propelling propeller 5 whereby the flow of air will act upon the propeller 21 to drive the rotors as desired. Should the engine become stalled and the aeroplane begin to drop, the flow of air against the propeller 21 will continue the operation thereof and the rotation of the rotors. A certain amount of drag or braking effect may be applied to the driving mechanism as may be desired, or, in the case of a helicopter, in the event of the driving mechanism of the rotors being connected to the engine and the engine stalls, the driving of the helicopter aerofoils by the flow of air as in a windmill and the turning over of the engine will act as a suitable brake for the purpose.

The head resistance or drag of a rotor tube at the leading edge of the aerofoil of an aeroplane will vary. With a surface velocity of the tube higher than the velocity of the air reacting against it the drag will be less than if the surface speed of the tube be not so high. Therefore, with a drive mechanism which permits of varying the surface velocity of the rotating tube by varying the rotations of the tube or rotor, it is possible to vary the stalling air speed of the aeroplane. The effect would be analogous to that of the slotted wing of Handley Page. The tube, of course, need not run the entire length of the leading edge of the aerofoil.

Figure 3:
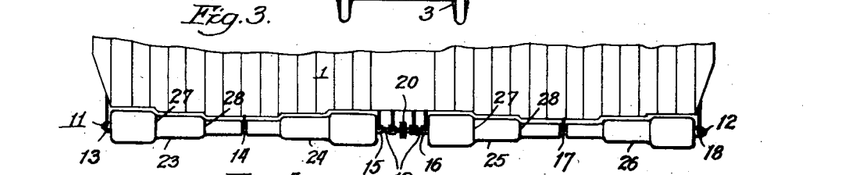
Figure 3 is a top plan view with parts broken away of an aeroplane embodying another form of rotors.

In Figure 3 is shown a part of an aeroplane with another form of rotors 23, 24, 25 and 26 having sections of different diameters or stepped such that rounded shoulders 27 and 28 are provided between the sections and act as flanges or disks located in planes transverse to or substantially perpendicular to the axis of rotation of the rotors. These rotors may be driven in the same manner as above described in connection with rotors 7, 8, 9 and 10.

Figure 4:
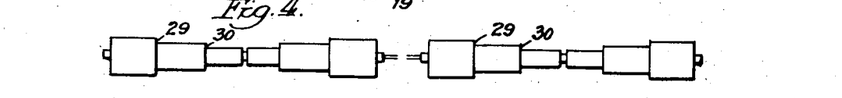
Figure 4 is a side or top plan view of another form of rotors.
Figure 5:
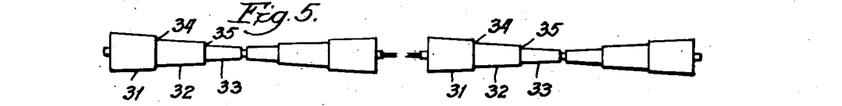
Figure 5 is a similar view of a still further form of rotors.

Other forms of rotors may be used as shown in Figure 4 where the stepped portions or sections have shoulders 29 and 30 forming a more sharp corner than those shown in Figure 3. Figure 5 shows similar rotors with tapering portions or sections 31, 32 and 33. Shoulders 34 and 35 are provided between the sections of these rotors similar to those above described.

These rotors are driven to rotate the surfaces thereof in the stream of the wind or air so that the top surface travels in the direction of the stream and the under surface in the opposite direction, so that there is a reduction in pressure in the region of the upper surface of the rotors and an increase in pressure in the region of the lower surface of the same. In order to be effective, these rotors must be driven at least two and one-half times the surface speed of that of the relative speed of the air to the aerofoil. This speed may be increased as desired. By making the rotors of varying diameter by either tapering or stepping the same to different diameters and providing shoulders therebetween, there is a lateral component thrust upon the air stream to the end of reducing, as much as possible, any end vortices of the air at the ends of the rotors. This effect is equivalent to the use of plates or flanges described hereinafter.

In Figures 6, 7, 8, 9 and 10 the invention is shown in connection with a helicopter having an aerofoil 40 or wing body supported by an axle member 41 suitably connected to the helicopter supporting structure. The aerofoil comprises a body portion 42 and a leading edge portion 43 between which are located rotor sections 44 and 45 rotatably supported by shafts 46, 47 and 48 having bearings 49, 50 and 51 formed in plates 52, 53 and 54 respectively. The sections 44 and 45 are preferably hollow and tapered as shown. In the ends of each section are provided heads 55, 56, 57 and 58 suitably secured to the tubes of the rotor and also to the shaft members 46, 47 and 48. These rotor sections may be driven in any suitable manner as by gears 59 and 60, shaft 61, gears 62 and 63, shaft 64 and gears 65 and 66. The gear 66 is secured to a relatively fixed part 67 of the helicopter.

The rotors 44 and 45 are located in a space 68 provided between the leading edge portion 43 of the wing and the body portion 42 thereof such that the upper and lower surface portions 69 and 70 of the rotor sections will be in the path of the wind passing above and below the aerofoil. The plates 52 and 53 are suitably secured to the aerofoil and located in planes transverse to the axis of rotation of the rotors so as to act with end thrust against the tendency of the wind forming vortices or eddies at the end of the rotor or at any other point adjacent thereto, the efficiency of the rotor being thus increased as above mentioned.

Inasmuch as the wings of a helicopter rotate about the axis of the member 67, it will become apparent that the outer end of the aerofoil will be traveling at a greater rate than any intermediate portion thereof and for this reason it is preferred to make the rotor sections tapered or divergent toward the outer end of the wings as shown in the drawings. In this way the surface speed of the rotor, which rotates in the direction of the arrows shown on rotors 44 and 45 in Figure 6, and within the rotor in Figure 8, will be greater at the outer end of the rotor and the wing than at the inner end thereof in order that the rate of surface speed of the rotor may be correct for that particular portion of the aerofoil passing through the air.

Figures 6, 7, 8, 10:
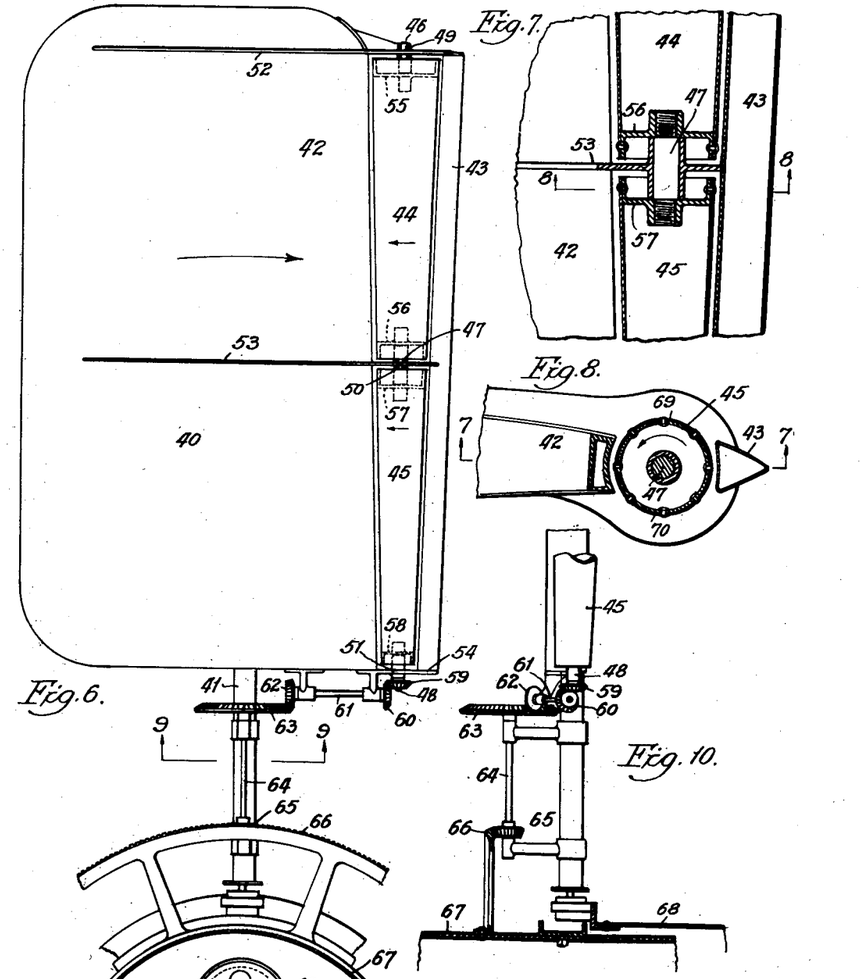
Figure 6 is a top plan view of a part of an aircraft, such as a helicopter, showing the embodying of a rotor in one of the aerofoils.
Figure 7 is a fragmentary sectional view of part of the device shown in Figure 6 and taken in a plane represented by line 7—7 in Figure 8 of the drawings.
Figure 8 is a transverse sectional view of part of the device and taken in a plane represented by line 8—8 of Figure 7 of the drawings.
Figure 10 is a fragmentary part elevational and part sectional view of the device shown in Figure 6.
Figure 9:
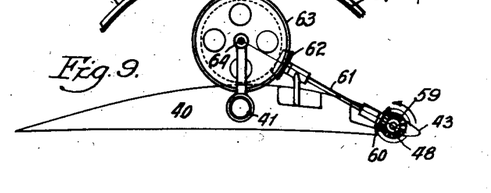
Figure 9 is an end view of the aerofoil and part of the driving mechanism and a part sectional view taken in the plane represented by line 9—9 in Figure 6 of the drawings.

The member 67 and gear 66 are held relatively fixed and the rotation of drum 68 with the aerofoil and gear 65 causes a drive through the driving mechanism above described and in the direction indicated.

While only a portion of a helicopter is here shown, it is to be understood that the application of the invention to other forms of helicopters is possible. A helicopter type of craft may have but one set of aerofoils operating in a plane substantially horizontal to the earth surface as in the La Cierva helicopter, or it may have two or more sets of aerofoils operating in the same plane, as in the Damblanc, the Berliner, the de Bothezat and the Oechmichen helicopters. It may also have two sets of aerofoils, one set superposed over the other and attached to drums rotating in opposite directions around a fixed spinal column, as in the Perry helicopter, or it may have two sets of aerofoils, superposed one set above the other, the sets rotating in opposite directions, the upper set attached to a rotating column telescoping within a larger column which rotates in the opposite direction and carrying the other set of foils, as in the Pateras Pescara and the Petrosky Karman helicopters.

Figure 11:
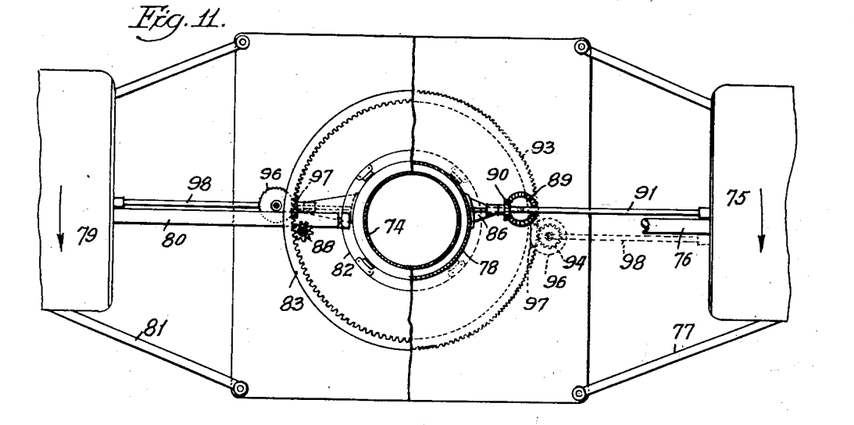
Figure 11 is a view partly in plan and partly in section of a helicopter structure, with parts broken away.
Figure 12:
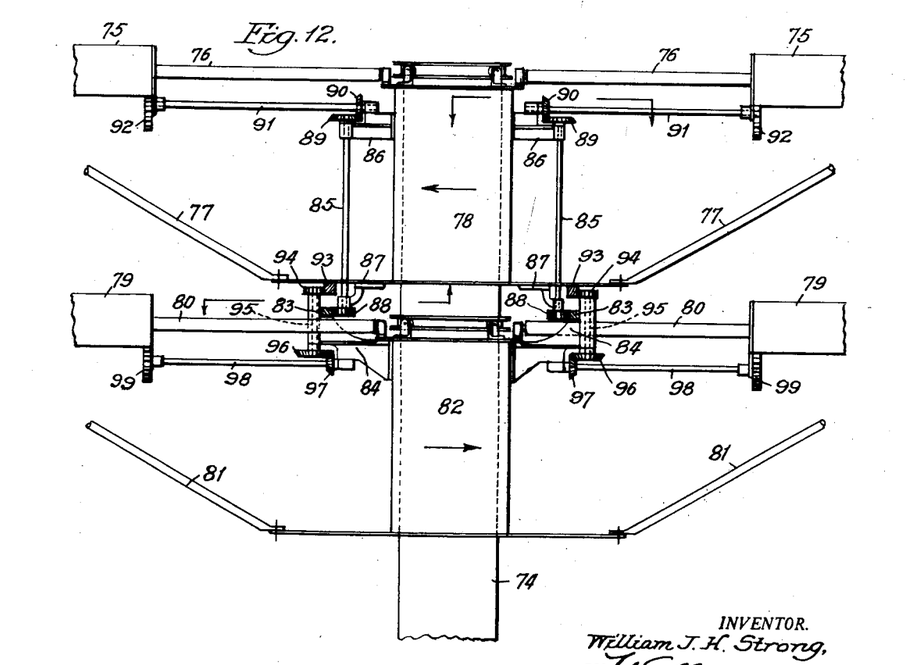
Figure 12 is a view in side elevation of the same.
Figure 13:
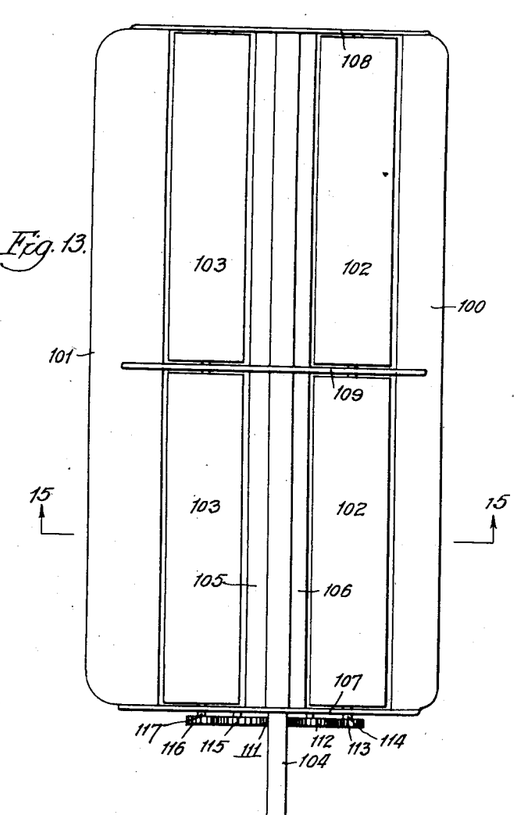
Figure 13 is a top plan view of an aerofoil embodying rotors therein.
Figure 14:
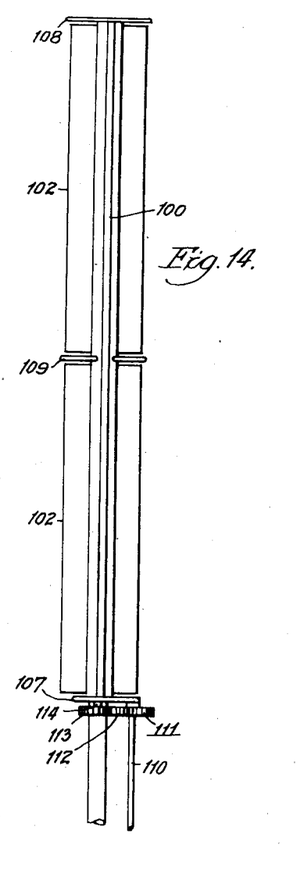
Figure 14 is an edge view thereof.
Figure 15:
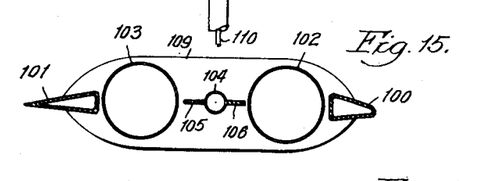
Figure 15 is a transverse sectional view thereof taken in the plane represented by the line 15—15 in Figure 13.
Figure 16:
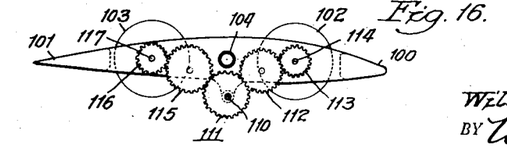
Figure 16 is an end view thereof.

In Figures 11 and 12 are shown the driving mechanism for the rotors for use in connection with a helicopter taking the advantage of the opposing thrusts of helicopter aerofoils rotating in opposite directions, one set of aerofoils being above the other, as in the Pateras Pescara and the Petrosky Karman types and also those of the Perry type. The driving mechanism here is designed to be operated by the operation of the aerofoils so that should the helicopter engine stall, the descent of the helicopter will cause the rotation of the aerofoils by reason of the upward current of air, and thus drive the rotors through the driving mechanism of the rotors. The upper aerofoils 75 are supported by members 76 and 77 connected in any suitable manner to a drum 78 rotating around a spinal column 74, in the direction of the arrow on the drum 78, and the lower aerofoils 79 are similarly supported upon members 80 and 81 suitably connected to the drum 82 rotating in an opposite direction to the drum 78, and in the direction of the arrow indicated upon this drum in the drawings. For driving the rotors of the upper aerofoils, a ring or internal gear 83 is suitably supported as by a bracket or the like 84 connected to the lower aerofoils and also to the drum 82 as clearly shown in Figure 12 of the drawings. In the upper fuselage is supported a shaft 85 rotatably mounted in brackets 86 secured to the column 78 and 87 secured to a member connected to the column 78. The lower end of the shaft 85 has a pinion 88 operating with the ring gear 83 and the upper end of the shaft has a mitre gear 89 operating a mitre gear 90 secured to a shaft 91 also having its bearings in the construction of the upper aerofoil structure. The shaft 91 has an end gear 92 connected in any suitable manner to drive the rotors (not shown in this figure). It will be thus noted that when the lower aerofoils are rotating the ring gear 83 carried by the fuselage thereof will cause a drive of the rotors of the upper aerofoils. One set of rotors may be driven from the structure of another set of rotors and that set driven from a reaction with a fixed member.

Similarly the rotating of the upper aerofoils will act to drive the rotors of the lower aerofoils. This is effected by a ring gear 93 secured to a member connected to the rotating drum 78 and meshing with a pinion 94 secured to a shaft 95 having its bearing in the brackets 84, the lower end of the shaft 95 having a mitre gear 96 operating with the mitre gear 97 secured to a shaft 98 having its bearings in the bracket 84 and part of the lower aerofoils. The outer end of the shaft 98 carries a gear 99 suitably connected to the rotors of the lower aerofoils to drive the same.

In this way it will be apparent that the rotors will be operated either by the engine of the helicopter or by the aerofoil construction when the engine is stalled, and when the aerofoils are caused to rotate as a windmill by the upward movement of the air as the helicopter is descending with engine stalled. The rotors will aid the aerofoils in making an easy landing. The helicopter, particularly of the Perry type, will thus come down safely from any altitude when the engine is stopped. Assuming that the engine becomes stalled when the helicopter is in mid-air, the helicopter will descend by gravity and the upward rush of air against the aerofoils will cause them to rotate similar to a windmill and thus retard the descent similar to a parachute. In order that the rotors be made to rotate independent of the engine, the invention comprehends the idea of driving the rotors by the rotating aerofoils, as the helicopter is descending, and thus make a safe and easy landing irrespective of the operation of the power unit. It will also be noted that the greater the speed of rotation of the aerofoils, the greater is the speed of rotation of the tubes or rotors and vice versa. Thus there is an automatic means provided for regulating the surface speed of the tubes as the speed of rotation of the aerofoils changes.

It will be noted that the type of aerofoils used here may be any one of those described in this specification.

While the use of a single line of rotating tubes or rotors may be effected to lift a large load, yet for obtaining flight such as in a helicopter, the aerofoil may be made mainly or wholly of a series of rotors arranged in the form of an aerofoil as shown in figures 13, 14, 15 and 16. In this embodiment the aerofoil, whether used on aeroplanes, helicopters, or other structures, the aerofoil comprises a leading and a trailing edge member 100 and 101 with two or more interposed rotors 102 and 103 and an axle 104 for the aerofoil, this axle having truss flanges 105 and 106 secured to end plates 107 and 108 and intermediate plate 109. The rotors are shown in sections and in the form of hollow cylinders, but it is to be understood they may be of any desired shape. The trailing rotor 103 may be driven at a speed greater than the surface speed of the rotor 102. Suitable driving means may be used for operating the rotors, such as a driving shaft 110 operating through a gear 111 in mesh with a gear 112 driving a gear 113 secured to one end of the shaft 114 for the rotor 102. The gear 111 also drives through gears 115 and 116, the latter being secured to the end of the shaft 117 for the rotor 103. It will be noted that the gear 116 may be of smaller diameter than the gear 113 in order that the rear or trailing rotor may be operated at a greater speed than the leading or forward rotor. The shafts 114 and 117 find suitable bearings in the plates 107, 109 and 108. These plates are secured to the leading and trailing edge members 100 and 101 and to the axle 104 and truss flanges 105 and 106. The axle 104, usually provided in devices of this kind, is of utility to tip or tilt the aerofoil as desired and as may be required. The plates 107 and 108 and 109 also act as lateral thrust members at the ends of the rotor sections to prevent or reduce the tendency of forming vortexes in the air or wind at the ends of said sections.

Figure 17:
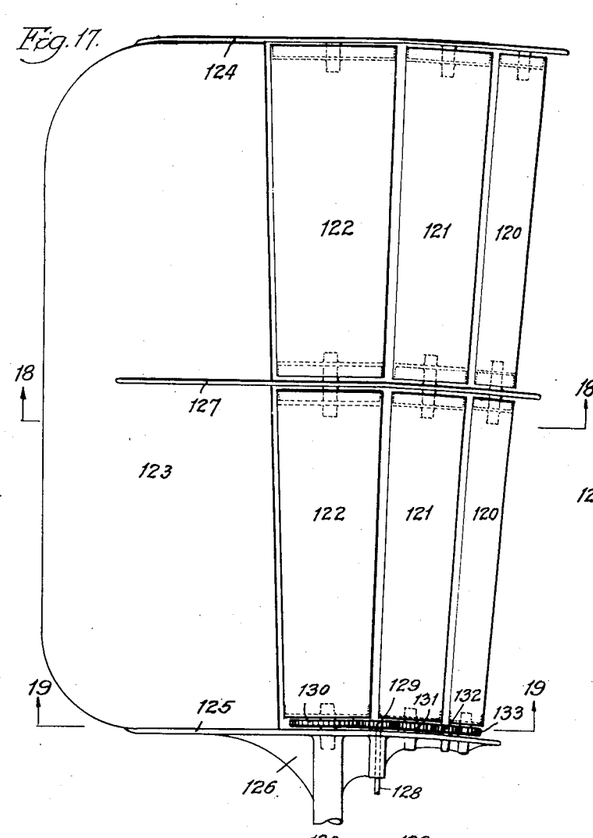
Figure 17 is a top plan view of another form of aerofoil.
Figure 18:
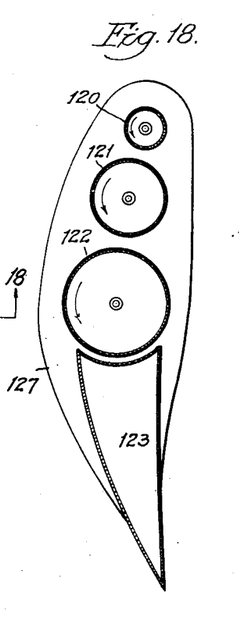
Figure 18 is a transverse sectional view thereof taken in a plane represented by line 18—18 in Figure 17.
Figure 19:
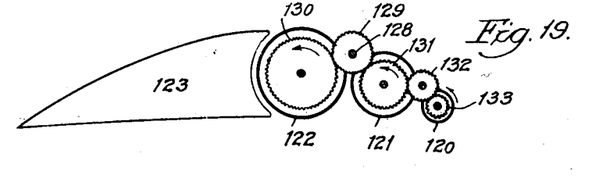
Figure 19 is a transverse sectional view taken in a plane represented by line 19—19.
Figures 20, 21, 22:
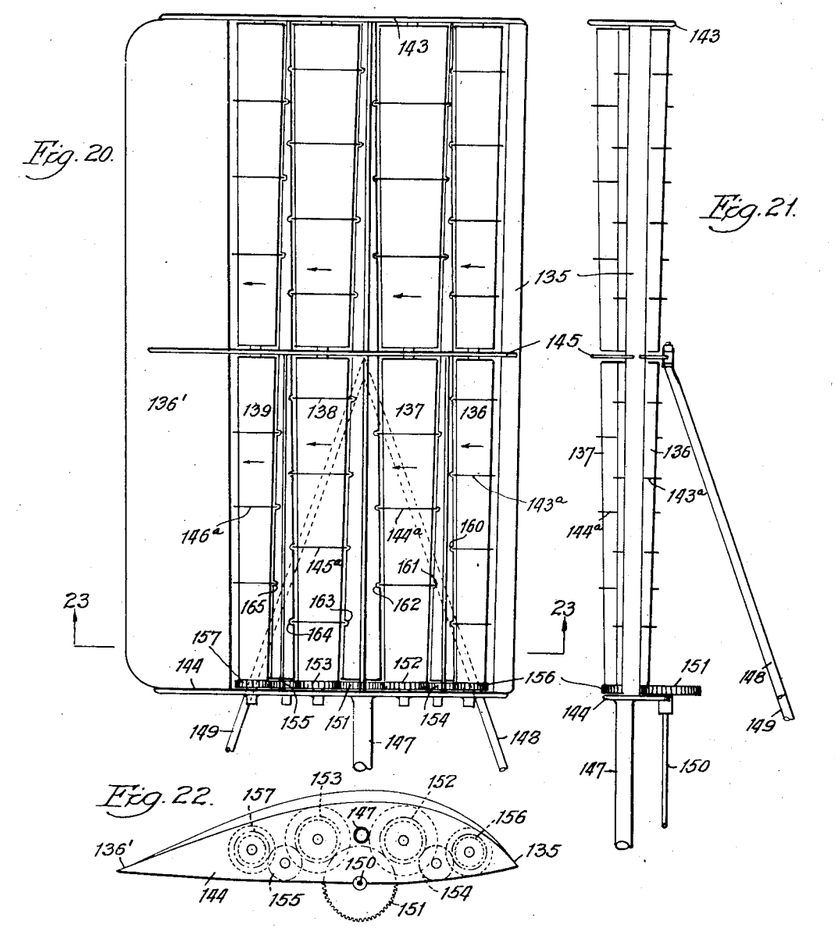
Figure 20 is a top plan view of another form of aerofoil.
Figure 21 is a front view thereof.
Figure 22 is an end view thereof; and, Figure 23 is a transverse sectional view thereof and taken in a plane represented by line 23—23.
Figure 23:
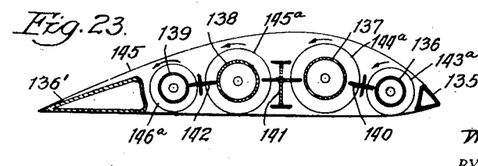

In Figures 17, 18 and 19 is shown another form of aerofoil having a series of rotors 120, 121 and 122 varying in diameters from each other and also varying in diameter axially or longitudinally of the rotors. The aerofoil is also provided with a trailing aerofoil portion 123 to the ends of which are secured end plates 124 and 125, the latter being rigid with a member of the craft. An intermediate plate 127 is also secured to the trailing portion of the aerofoil and extends forward to carry bearings for the adjacent ends of the sections of the rotors, as clearly shown and similarly to the bearing mounting of the device shown in Figures 6, 7, 8, 9 and 10 of the drawings. These plates 124, 125 and 127 also serve as guards or thrust members at the ends of the rotor sections for increasing the efficiency of the rotors and preventing vortices at the ends of the sections. The rotors may be driven at any desired speed but preferably such that a succeeding rotor will have a greater surface speed than a preceding rotor. They may be driven from a shaft 128 having a bearing in the member 126 and secured to a gear 129 meshed with gears 130 and 131 respectively secured to the ends of the rotors 122 and 121. The gear 131 also meshes with a gear 132 which in turn meshes with a gear 133 secured to the inner end of the rotor 120.

In Figures 20, 21, 22 and 23 is shown another form of aerofoil having a leading edge 135 and a trailing edge 136' and an intermediate series of rotors 136, 137, 138 and 139 increasing in diameter serially and also each varying in diameter longitudinally or axially of the rotor. Between the rotors may be located truss members 140, 141 and 142 which act to reinforce the aerofoil and also close the spaces between the peripheries of the rotors, as clearly shown in Figure 23 of the drawings. These truss members are secured to end plates 143 and 144, and an intermediate plate 145, these plates being also secured at their ends to the front and leading edges 135 and 136. These plates also serve the purpose of guards at the ends of the rotor sections for the purpose already described. These rotors also have a plurality of peripheral flanges 143$^a$, 144$^a$, 145$^a$ and 146$^a$. The end plate 144 may be secured to an axle 147 and suitable stays 148 and 149, forming a part of the fuselage, may be secured to the truss member 141 for the purpose of staying the aerofoils. These rotors may be driven at desired speed, preferably with the succeeding rotors operating at a greater surface speed than the preceding rotors, and may be driven from a shaft 150 secured to a gear 151 meshing with gears 152 and 153 respectively secured to the inner ends of the rotors 137 and 138. Gears 152 and 153 are in mesh with intermediate gears 154 and 155 which are in turn in mesh with gears 156 and 157 respectively secured to the inner ends of the rotors 136 and 139.

It will be noted that the truss members 140, 141 and 142 are provided with grooves or notches 160, 161, 162, 163, 164 and 165 to permit the free passage or rotation of the flanges 143$^a$, 144$^a$, 145$^a$ and 146$^a$ on the rotors. This arrangement of the rotors and intermediate members provides for a very efficient aerofoil which may be of less width than usually provided and will also provide for an aerofoil of less width at one end than at the other as desired. The disks or flanges 143$^a$, 144$^a$, 145$^a$ and 146$^a$ will increase the skin or surface friction of the rotor tube, and they together with the flanges or plates 143, 144 and 145 at the end of the rotor sections will increase the efficiency of the rotors to the extent as if the rotors were of infinite length.

While I have herein described and upon the drawings shown a few embodiments of my invention, it is to be understood that the same is not limited to the particular details, constructions and arrangements of parts disclosed, but comprehends other details, constructions and arrangements of parts without departing from the spirit thereof.

Having thus disclosed my invention, I claim:—

1. In a device for operating in a fluid, means for causing a relative movement of the device and the fluid, a rotor adapted when rotating to act on the fluid to effect a reaction between the rotor and the fluid transversely to the direction of movement of the fluid, and a plate extending radially from and perpendicularly to the axis of the rotor and substantially beyond the periphery of said rotor.

2. In a device for acting in a fluid, means for causing a relative movement of the device and the fluid, a rotor varying in diameter and adapted to act on the fluid when rotating to effect a stress upon the rotor transversely to the direction of the movement of the fluid, and a plate lying in a plane transverse to the axis of the rotor and extending radially from and perpendicularly to the axis of the rotor and substantially beyond the periphery of said rotor.

3. In a device for acting in a fluid, means for causing a relative movement of the device and the fluid, a rotor adapted when rotating to act on the fluid to effect a stress upon the rotor transversely to the direction of movement of the fluid, and a disk secured to and rotatable with said rotor and extending radially from and perpendicularly to the axis of the rotor and substantially beyond the periphery of said rotor.

4. In a device for operating in a fluid, means for causing a relative movement of the device and the fluid, a rotor adapted when rotating to act on the fluid to effect a reaction of the rotor and the fluid transversely to the direction of movement of the fluid, and spaced peripheral flanges on said rotor rotating therewith, and extending radially from and perpendicularly to the axis of the rotor and substantially beyond the periphery of said rotor.

5. A rotor for use with a device adapted to cause a relative movement of the device and a fluid, comprising a rotating member varying in diameter longitudinally thereof and adapted to act upon relatively moving fluid to cause a transverse reaction of the rotor and the fluid, said rotor having a peripheral flange rotating with said rotor and extending radially from and perpendicularly to the axis of the rotor and substantially beyond the periphery of said rotor.

6. A rotor for use with a device adapted to cause a relative movement of the device and a fluid, comprising a rotating member varying in diameter longitudinally thereof and adapted to act upon relatively moving fluid to cause a reaction between the rotor and the fluid and transversely thereof, said rotor having a plurality of spaced flanges rotating with and extending beyond the periphery of said rotor and disposed in planes transverse to the axis of rotation of the rotor.

7. An aerofoil comprising a rotating member located at the leading edge of the body of the aerofoil and acting when rotating to effect a stress upon the rotor and the aerofoil body in a direction transverse to the direction of movement of the air relative to said rotor and aerofoil, and means for regulatably rotating said member.

8. An aerofoil structure comprising a series of rotors arranged in the form of an aerofoil.

9. An aerofoil structure comprising a series of rotors arranged in the form of an aerofoil, said rotors varying in diameter axially thereof.

10. An aerofoil structure comprising a series of rotors arranged in the form of an aerofoil, said rotors having peripheral flanges in planes transverse to the axis of rotation of said rotors, and extending radially from and perpendicularly to the axis of the rotors and substantially beyond the periphery of said rotors.

11. An aerofoil structure comprising a series of rotors arranged in the form of an aerofoil, said rotors varying in diameter axially thereof and having peripheral flanges in planes transverse to the axis of rotation of said rotors, and extending radially from and perpendicularly to the axis of the rotors and substantially beyond the periphery of said rotors.

12. An aerofoil structure comprising a series of rotors having the general contour of an aerofoil, and having their surfaces rotating in a fluid moving relative to the structure, means to rotate said rotors whereby the succeeding rotors rotate at a greater speed than the preceding rotors.

13. A group of rotors arranged in the form of an aerofoil.

14. A group of rotors varying in diameter and arranged in the form of an aerofoil.

15. An aerofoil having a rotor at the leading edge thereof, and means for rotating said rotor.

16. An aircraft having an aerofoil, a rotor rotatably located at the leading edge of said aerofoil, and means for rotating said rotor.

17. An aerofoil, a rotor rotatably located at the leading edge of said aerofoil, said rotor varying in diameter axially thereof.

18. An aircraft having an aerofoil, a rotor rotatably located at the leading edge of said aerofoil, said rotor varying in diameter axially thereof, and means carried by the aircraft and connected to said rotor whereby said means is actuated by the relative movement of the air to cause a rotation of said rotor.

19. A device for producing a progressive reaction in a fluid, comprising a series of rotating members arranged in the form of an aerofoil and having progressively increasing rates of surface speed serially of said series of members.

20. A device for producing a progressive reaction in a fluid, comprising a series of rotating members arranged in the form of an aerofoil and having progressively increasing rates of surface speed serially of said series of members, and means for rotating said members.

21. A device for producing a progressive reaction in a fluid, comprising a series of rotating members arranged in the form of an aerofoil and having progressively increasing rates of surface speed serially of said series of members, and means for rotating said members, said rotating means including means for varying the rate of speed.

22. An aerofoil comprising a rotor and means for varying the rotative speed of the rotor independently as the speed of the areofoil varies in relation to a fluid.

23. In an aerofoil, a rotor, and means for rotating the rotor independently of the reaction between the aerofoil and a fluid acting upon said aerofoil.

24. An aerofoil comprising a rotor and a member having a surface lying approximately in the direction of motion of an air stream passing said aerofoil, and means for varying the speed of the rotor independently of the speed of the aerofoil moving through said air.

25. An aerofoil comprising a member having a surface lying approximately in the direction of motion of an air stream passing said aerofoil and having a rotatable entering edge, means for causing the aerofoil to move through the air stream and means independent of the first said means for causing the rotor to rotate as the aerofoil moves through said stream.

26. An aerofoil comprising a member having a surface lying approximately in the direction of motion of an air stream passing said aerofoil, a rotor arranged along the entering edge of said member, and means for rotating said rotor.

27. In an aircraft, a wing or fin, a rotatable cylinder having its axis in the plane of the fin or wing and means for rotating said cylinder by the motion of the plane and supplemental power connections for increasing the rotation and for controlling the speed of rotation of the cylindrical surface.

In witness whereof, I hereunto subscribe my name to this specification.

WILLIAM J. H. STRONG.